(12) United States Patent
Comeau et al.

(10) Patent No.: US 9,497,745 B2
(45) Date of Patent: Nov. 15, 2016

(54) VIRTUAL MACRO CELLS

(71) Applicant: Telefonaktiebolaget L M Ericsson (publ), Stockholm (SE)

(72) Inventors: Adrien Comeau, Ottawa (CA); Greg Osborne, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 446 days.

(21) Appl. No.: 13/764,120

(22) Filed: Feb. 11, 2013

(65) Prior Publication Data

US 2014/0226570 A1    Aug. 14, 2014

(51) Int. Cl.
| | | |
|---|---|---|
| H04W 72/04 | (2009.01) | |
| H04W 16/32 | (2009.01) | |
| H04W 36/32 | (2009.01) | |
| H04W 28/06 | (2009.01) | |
| H04W 84/04 | (2009.01) | |

(52) U.S. Cl.
CPC ......... H04W 72/042 (2013.01); H04W 16/32 (2013.01); H04W 28/06 (2013.01); H04W 36/32 (2013.01); H04W 72/04 (2013.01); H04W 84/045 (2013.01)

(58) Field of Classification Search
None
See application file for complete search history.

(56) References Cited

U.S. PATENT DOCUMENTS

| | | | |
|---|---|---|---|
| 5,548,806 A * | 8/1996 | Yamaguchi et al. .......... 455/441 | |
| 7,933,248 B2 | 4/2011 | Hong et al. | |
| 8,165,070 B2 | 4/2012 | Salminen | |
| 2008/0305799 A1 | 12/2008 | Zuniga et al. | |
| 2011/0261785 A1 * | 10/2011 | Kwon .................. H04W 36/30 | 370/331 |
| 2012/0015655 A1 * | 1/2012 | Lee ........................... 455/435.1 | |
| 2012/0039226 A1 * | 2/2012 | Yang ................ H04W 52/0277 | 370/311 |
| 2012/0122456 A1 * | 5/2012 | Gao ..................... H04W 36/245 | 455/436 |
| 2013/0065622 A1 * | 3/2013 | Hwang ................ H04W 16/28 | 455/500 |
| 2014/0018076 A1 * | 1/2014 | Zhou et al. ................... 455/436 | |

(Continued)

FOREIGN PATENT DOCUMENTS

| | | |
|---|---|---|
| EP | 2200369 A2 | 6/2010 |
| EP | 2528371 A1 | 11/2012 |

OTHER PUBLICATIONS

Author Unknown, "3rd Generation Partnership Project; Technical Specification Group Radio Access Network; Coordinated multi-point operation for LTE physical layer aspects (Release 11)," Technical Report 36.819, Version 11.1.0, Dec. 2011, 3GPP Organizational Partners, 69 pages.

(Continued)

*Primary Examiner* — Duc Duong
(74) *Attorney, Agent, or Firm* — Withrow & Terranova, PLLC

(57) ABSTRACT

Systems and methods that provide a virtual macro cell in a heterogeneous cellular communications network are disclosed. In general, micro cells served by multiple micro base stations are aggregated to provide a virtual macro cell. Each micro base station provides service to one or more low mobility user equipments (LMUs) located within the micro cell of the micro base station using one or more first resources (e.g., a first carrier) that are allocated to LMUs. In addition, each micro base station cooperates with the other micro base station(s) in the virtual macro cell to provide service to one or more high mobility user equipments (HMUs) located within the virtual macro cell using one or more second resources (e.g., a second carrier) that are allocated to HMUs. By utilizing the virtual macro cell for HMUs, handover and paging overhead are reduced for the heterogeneous cellular communications network.

25 Claims, 13 Drawing Sheets

(56) References Cited

U.S. PATENT DOCUMENTS

| | | | |
|---|---|---|---|
| 2014/0036737 A1* | 2/2014 | Ekpenyong et al. | 370/280 |
| 2014/0185465 A1* | 7/2014 | Balachandran et al. | 370/252 |
| 2014/0198659 A1* | 7/2014 | Vargas Bautista et al. | 370/236 |
| 2014/0307576 A1* | 10/2014 | Nagata et al. | 370/252 |
| 2015/0072706 A1* | 3/2015 | Michaelsen et al. | 455/456.1 |

OTHER PUBLICATIONS

Author Unknown, "3rd Generation Partnership Project; Technical Specification Group Radio Access Network; Scenarios and Requirements for Small Cell Enhancements for E-UTRA and E-UTRAN (Release 12)," Technical Report 36.932, Version 12.0.0, Dec. 2012, 3GPP Organizational Partners, 14 pages.

Author Unknown, "Aspects on Distributed RRUs with Shared Cell-ID for Heterogeneous Deployments," Ericsson, ST-Ericsson, R1-110649, 3GPP TSG-RAN WG1 Meeting #64, Feb. 21-25, 2011, Taipei, Taiwan, 11 pages.

Author Unknown, "Combined Cell Deployment Scenarios in Heterogeneous Networks," Ericsson, ST-Ericsson, R1-125220, 3GPP TSG RAN WG1 Meeting #71, Nov. 12-16, 2012, New Orleans, LA, 5 pages.

Author Unknown, "Deployment scenarios and interference mitigation schemes for eIMTA," NTT DOCOMO, R1-130401, 3GPP TSG RAN WG1 Meeting #72, Jan. 28-Feb. 1, 2013, St. Julian's, Malta, 8 pages.

Author Unknown, "Mobility Enhancement in Small Cell Cluster," NTT DOCOMO, R1-130406, 3GPP TSG RAN WG1 Meeting #72, Jan. 28-Feb. 1, 2013, St. Julian's, Malta, 11 pages.

Author Unknown, "Mobility Enhancement with UE Speed Detection," NTT DOCOMO, R1-130407, 3GPP TSG RAN WG1 Meeting #72, Jan. 28-Feb. 1, 2013, St. Julian's, Malta, 5 pages.

Author Unknown, "Overview of Combined Cell Deployment in Heterogeneous Networks," Ericsson, ST-Ericsson, R1-130610, 3GPP TSG RAN WG1 Meeting #72, Jan. 28-Feb. 1, 2013, St. Julian's, Malta, 12 pages.

Author Unknown, "Overview of Mobility Enhancement for Small Cell Enhancement," NTT DOCOMO, R1-130405, 3GPP TSG RAN WG1 Meeting #72, Jan. 28-Feb. 1, 2013, St. Julian's, Malta, 8 pages.

Lee, Daewon et al., "Coordinated Multiport Transmission and Reception in LTE-Advanced: Deployment Scenarios and Operational Challenges," IEEE Communications Magazine, vol. 50, Issue 2, Feb. 2012, IEEE, pp. 148-155.

International Search Report and Written Opinion for PCT/IB2013/061004, mailed Jun. 18, 2014, 17 pages.

Author Unknown, "4G LTE CoMP, Coordinated Multipoint," Radio-Electronics.com, Retrieved: Jan. 7, 2013, 6 pages, http://www.radio-electronics.com/info/cellulartelecomms/lte-long-term-evolution/4g-lte-advanced-comp-coordinated-multipoint.php.

Ramanath, Sreenath et al., "Spatial Queueing Analysis for Mobility in Pico Cell Networks," 8th International Symposium on Modeling and Optimization in Mobile, Ad Hoc, and Wireless Networks (WiOpt 2010), May 31-Jun. 4, 2010, pp. 26-33.

International Preliminary Report on Patentability for International Patent Application No. PCT/IB2013/061004, mailed Aug. 20, 2015, 10 pages.

* cited by examiner

VIRTUAL MACRO CELLS

FIELD OF THE DISCLOSURE

The present disclosure relates to a cellular communications network and more particularly relates to a virtual macro cell for use in a cellular communications network.

BACKGROUND

FIG. 1 illustrates one example of a cellular communications network 10. In this particular example, the cellular communications network 10 is a Long Term Evolution (LTE) network. The cellular communications network 10 includes a Radio Access Network (RAN) that includes base stations 12-1 through 12-3, which for LTE are referred to as eNodeB's, that serve mobile terminals (not shown) located in corresponding cells 14-1 through 14-3. Mobile terminals are referred to herein as User Equipments (UEs). The base stations 12-1 thorough 12-3 are generally referred to herein collectively as base stations 12 and individually as base station 12. Likewise, the cells 14-1 through 14-3 are generally referred to herein collectively as cells 14 and individually as cell 14. Only three base stations 12-1 through 12-3 are illustrated in FIG. 1 for clarity and ease of discussion. However, the cellular communications network 10 typically includes many base stations 12 and corresponding cells 14. For LTE, each cell 14 includes one or more (e.g., 3) sectors.

The cellular communications network 10 further includes a core network 16 that includes Serving Gateways (S-GWs) 18-1 and 18-2, which are generally referred to herein collectively as S-GWs 18 or individually as S-GW 18, and Mobility Management Entities (MMEs) 20-1 and 20-2, which are generally referred to herein collectively as MMEs 20 and individually as MME 20. While two S-GWs 18 and two MMEs 20 are illustrated in this example, the core network 16 typically includes many S-GWs 18 and MMEs 20. In LTE, the base stations 12 are connected to the appropriate S-GWs 18 via S1-u connections and connected to the appropriate MMEs 20 via S1-c connections. Similarly, the base stations 12 are connected to one another via X2 connections. The S-GWs 18 are user plane nodes connecting the core network 16 to the RAN. Among other things, the S-GWs 18 serve as mobility anchors when UEs move between the cells 14 served by the base stations 12 as well as mobility anchors for other $3^{rd}$ Generation Partnership Project (3GPP) technologies (Global System for Mobile Communications (GSM)/General Packet Radio Service (GPRS) and High Speed Packet Access (HSPA)). The MMEs 20 are control plane nodes of the core network 16. The responsibilities of the MMEs 20 include connection/release of bearers to UEs, handling of idle to active transitions, and handling of security keys.

One issue with the cellular communications network 10 of FIG. 1 is that localized capacity requirements may exceed the capabilities of the cellular communications network 10. For example, in a city, a large number of UEs may be located in particular areas within the cells 14 (e.g., a large number of users may be located along the streets of the city). Another issue with the cellular communications network 10 of FIG. 1 is that there may be localized coverage holes. For example, in a city, the base stations 12 are typically placed on top of buildings and coverage holes can occur at the street level and inside buildings.

Heterogeneous cellular communications networks have emerged to provide increased localized capacity (e.g., wireless hotspots) and increased coverage (e.g., address localized coverage holes). One example of a heterogeneous cellular communications network 22 is illustrated in FIG. 2. As illustrated, the heterogeneous cellular communications network 22 includes a RAN including a macro base station (BS) 24 serving a macro cell 26 and micro base stations 28-1 and 28-2 serving corresponding micro cells 30-1 and 30-2. The micro base stations 28-1 and 28-2 are generally referred to herein collectively as micro base stations 28 and individually as micro base station 28, and the micro cells 30-1 and 30-2 are generally referred to herein collectively as micro cells 30 and individually as micro cell 30. Note that while only one macro base station 24 and two micro base stations 28 are illustrated in this example, the heterogeneous cellular communications network 22 may include any number of macro base stations 24 and micro base stations 28. As one example, the heterogeneous cellular communications network 22 may be deployed in a city where the macro base station(s) 24 are located on the top of buildings and the micro base stations 28 are located at street level. The heterogeneous cellular communications network 22 also includes a core network 32 including a S-GW 34 and a MME 36.

One issue with heterogeneous cellular communications networks such as that shown in FIG. 2 is that UEs can quickly transition across many micro cells. For instance, multiple adjacent micro cells may provide coverage along busy streets. UEs, such as those of users inside moving automobiles, quickly transition across many micro cells. The quick transition of the UEs across many micro cells results in significant handover and paging overhead on the heterogeneous cellular communications network. As an example, FIG. 3 illustrates a heterogeneous cellular communications network 38 that includes micro base stations 40-1 through 40-3 (generally referred to herein collectively as micro base stations 40 and individually as micro base station 40) that serve three adjacent micro cells 42-1 through 42-3 (generally referred to herein as micro cells 42 and individually as micro cell 42). The micro base stations 40 may, for example, provide coverage along a busy street. A UE 44 quickly transitions across the micro cells 42. The quick transition of the UE 44 across the micro cells 42 results in multiple handovers (HO 1 and HO 2) in a relatively short amount of time.

In light of the discussion above, there is a need for systems and methods for reducing handover and paging overhead in heterogeneous cellular communications networks.

SUMMARY

Systems and methods that provide a virtual macro cell in a heterogeneous cellular communications network are disclosed. In general, micro cells served by multiple micro base stations are aggregated to provide a virtual macro cell. Each micro base station provides service to one or more low mobility user equipments (UEs) located within the micro cell of the micro base station using one or more first resources (e.g., a first carrier) that are allocated to low mobility UEs (LMUs) located within the micro cell of the micro base station. In addition, each micro base station cooperates with the other micro base station(s) in the virtual macro cell to provide service to one or more high mobility UEs (HMUs) located within the virtual macro cell using one or more second resources (e.g., a second carrier) that are allocated to HMUs located within the virtual macro cell. By utilizing the virtual macro cell for HMUs, handover and paging overhead are reduced for the heterogeneous cellular communications network.

In one embodiment, the micro base station cooperates with the other micro base stations in the virtual macro cell to provide Coordinated Multipoint (COMP) transmission for downlink transmissions to the one or more HMUs served by the virtual macro cell and COMP reception for uplink transmissions from the one or more HMUs served by the virtual macro cell. Still further, in one embodiment, the one or more first resources is or includes a first carrier and the one or more second resources is or includes a second carrier, and Carrier Aggregation (CA) is utilized to provide service to one or more LMUs in the micro cell using both the first carrier and the second carrier when, for example, resources of the second carrier during a time allocation are unused by HMUs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods that provide a virtual macro cell in a heterogeneous cellular communications network are disclosed. By utilizing virtual macro cells for High Mobility User Equipments (HMUs), handover and paging overhead are reduced for the heterogeneous cellular communications network. Before proceeding, it should be noted that throughout this description some terminology that is specific to Long Term Evolution (LTE) may be used in some instances. However, the concepts disclosed herein are not limited to any particular cellular communications standard. Specifically, while systems and methods disclosed herein may be utilized in an LTE heterogeneous cellular communications network, they are not limited thereto.

Figure 1:
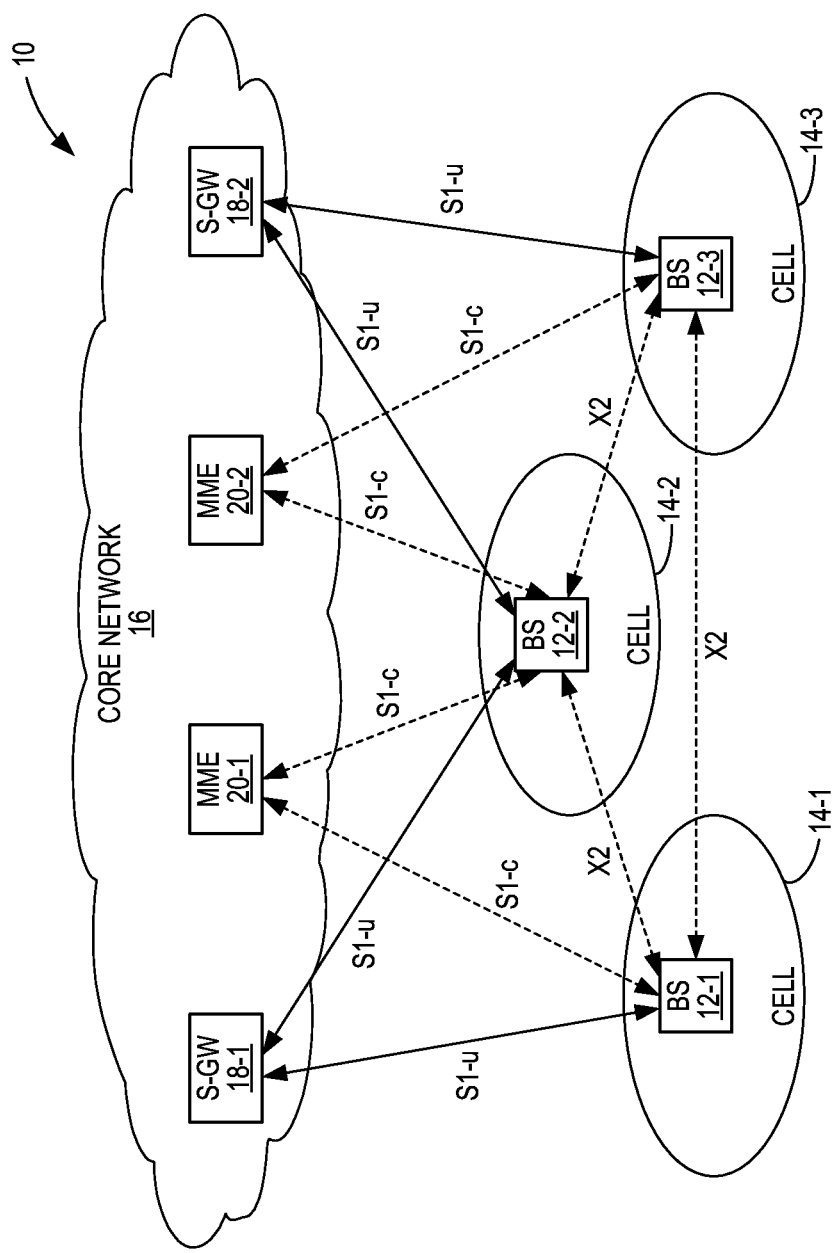
FIG. 1 illustrates a conventional cellular communications network.
Figure 2:
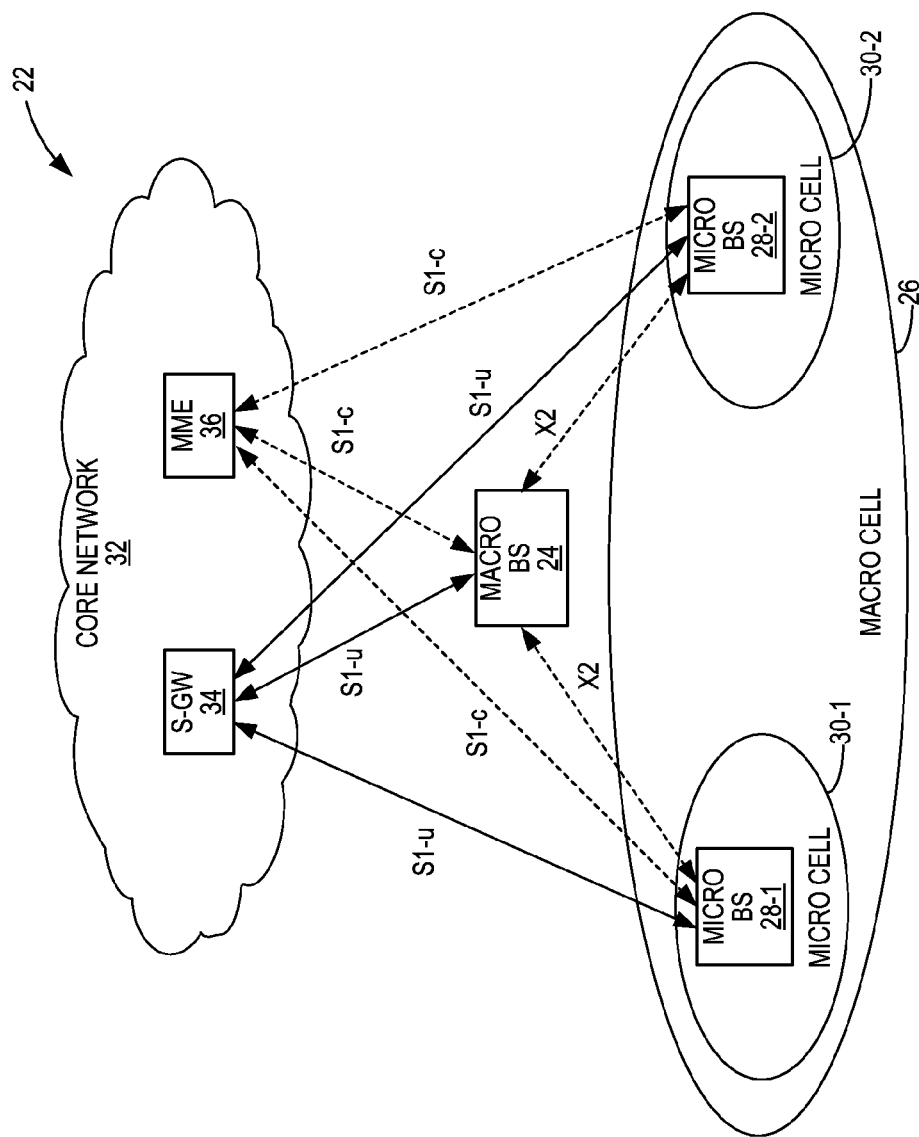
FIG. 2 illustrates one example of a conventional heterogeneous cellular communications network having both a macro cell and micro cells.
Figure 3:
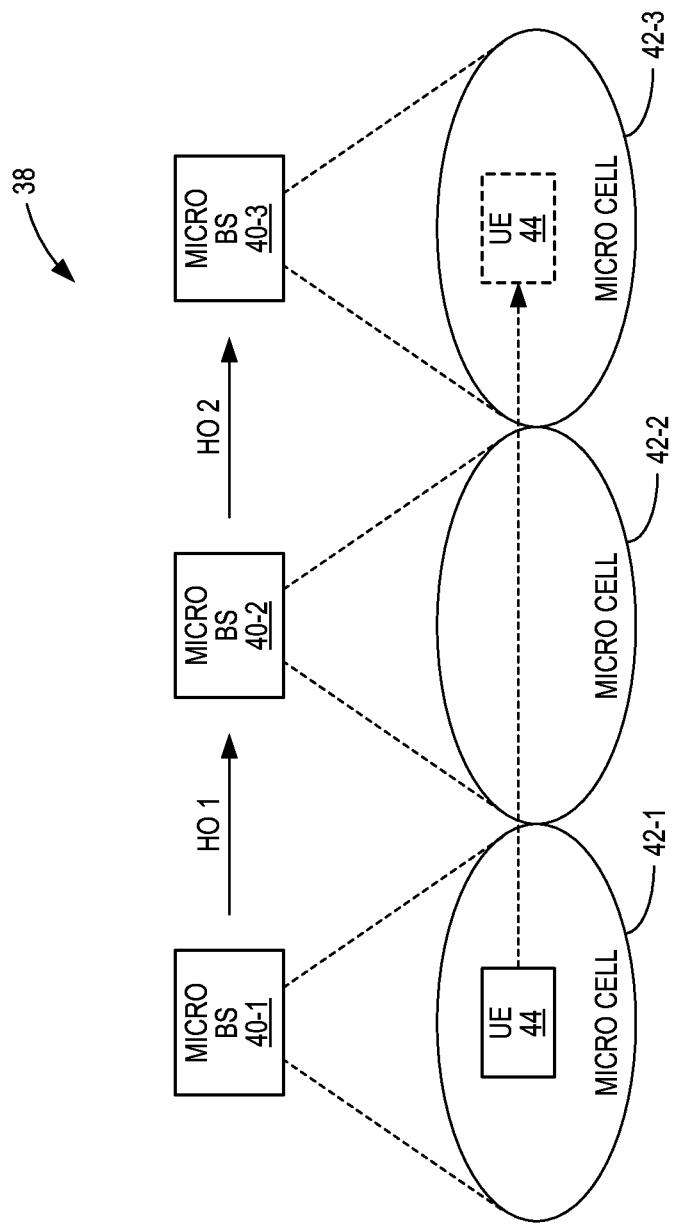
FIG. 3 is a graphical illustration of numerous handovers resulting from a high mobility user equipment (UE) in a conventional heterogeneous cellular communications network.
Figure 4:
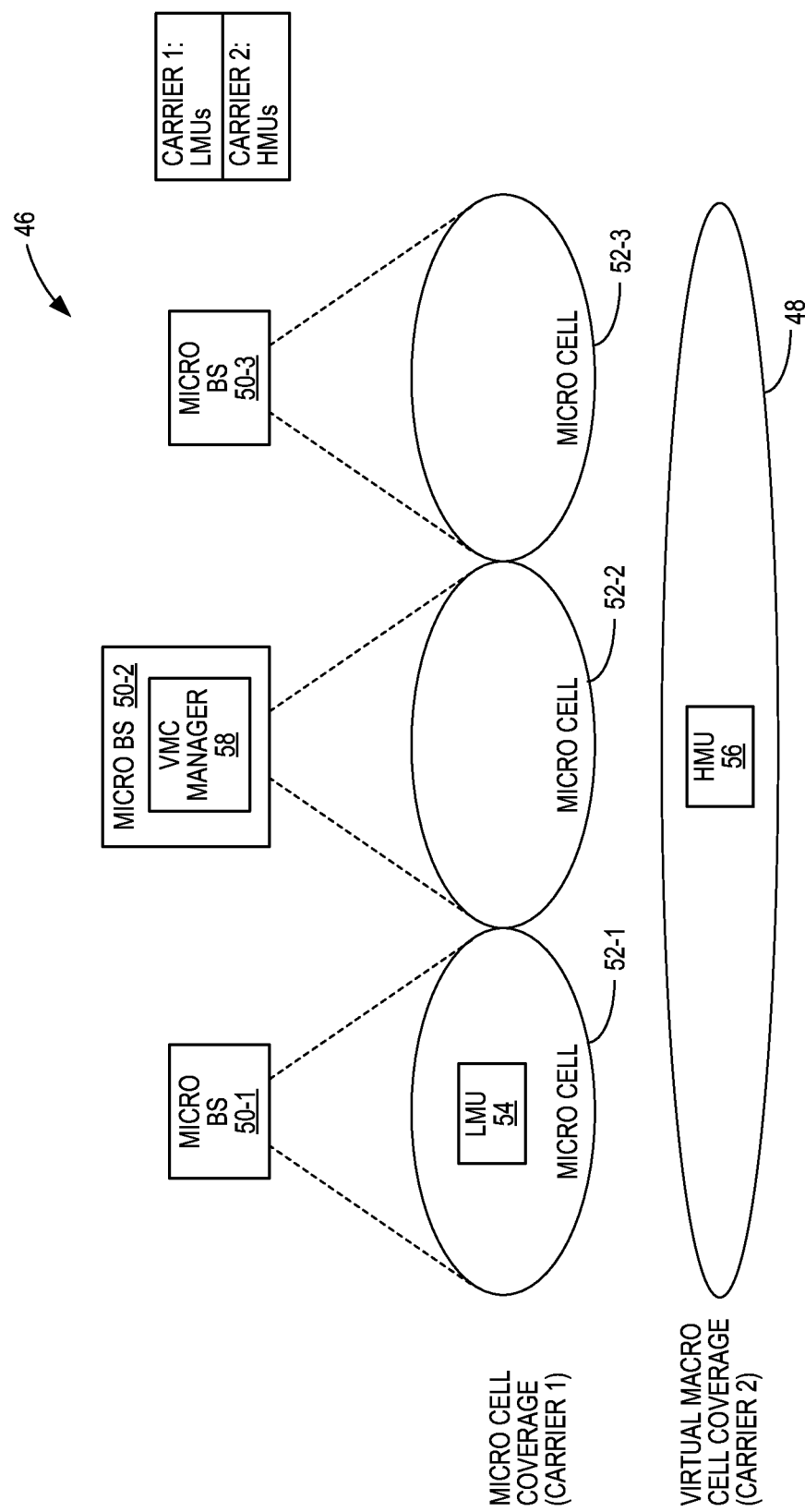
FIG. 4 illustrates a virtual macro cell for a heterogeneous cellular communications network according to one embodiment of the present disclosure.

FIG. 4 illustrates a heterogeneous cellular communications network 46 including a virtual macro cell 48 provided by a number of micro base stations (BSs) 50-1 through 50-3 according to one embodiment of the present disclosure. While not illustrated, the heterogeneous cellular communications network 46 includes macro base station(s) and potentially other micro base stations. Some of the other micro base stations may form additional virtual macro cells. The micro base stations 50-1 through 50-3 are generally referred to herein collectively as micro base stations 50 and individually as micro base station 50. The micro base stations 50-1 through 50-3 serve User Equipments (UEs) located within corresponding micro cells 52-1 through 52-3, which are generally referred to herein collectively as micro cells 52 and individually as micro cell 52. The virtual macro cell 48 is an aggregation of the micro cells 52 of the micro base stations 50. The micro cells 52 aggregated to provide the virtual macro cell 48 are adjacent to one another such that the virtual macro cell 48 is contiguous. Note that while the virtual macro cell 48 is an aggregation of three micro cells 52 in this example, the virtual macro cell 48 may be an aggregation of any number of two or more micro cells 52.

In general, resources of the micro base stations 50 are bifurcated to provide one or more first resources that are allocated to Low Mobility UEs (LMUs) located in the corresponding micro cells 52 and one or more second resources that are allocated to HMUs located in the virtual macro cell 48. Thus, for example, the micro base station 50-1 provides service to LMUs, such as LMU 54, located within the micro cell 52-1 using the one or more first resources that are allocated to LMUs in the conventional manner for a micro base station in a heterogeneous cellular communications network. Conversely, the micro base stations 50 cooperate to provide service to HMUs, such as HMU 56, located within the virtual macro cell 48 using the one or more second resources that are allocated to HMUs. In this manner, the number of handovers and paging requests for HMUs is substantially reduced as compared to that in a conventional heterogeneous cellular communications network.

More specifically, in this embodiment, each micro base station 50 allocates a first carrier of the micro base station 50 to LMUs and allocates, and more specifically nominally allocates, a second carrier of the micro base station 50 to HMUs. The first and second carriers may have different bandwidths. As one example, the first carrier may have a bandwidth of 15 Megahertz (MHz), and the second carrier may have a bandwidth of 5 MHz. However, any desired bandwidths may be used. Note that while the discussion below focuses on embodiments where the one or more first resources and the one or more second resources are different carrier frequencies, the present disclosure is not limited thereto. Other types of transmit and receive resources may alternatively be used.

The first carrier is preferably but not necessarily different for each of the micro base stations 50. Thus, in order to reduce interference, the first carrier for the micro base station 50-1 is different than the first carrier for the micro base station 50-2 and both the first carrier of the micro base station 50-1 and the first carrier of the micro base station 50-2 are different than the first carrier of the micro base station 50-3. The second carrier is the same for all of the micro base stations 50 in the virtual macro cell 48. Notably, for a Frequency Division Duplexing (FDD) transmission and reception scheme, there is a first set of first and second carriers for uplink transmissions and a second set of first and second carriers for downlink transmissions. For a Time Division Duplexing (TDD) transmission and reception scheme, the uplink and downlink time allocations can be partitioned in to time sub-allocations for the LMU and HMU analogous to the first and second resource allocation in FDD. In addition multiple radio frequency carriers could be used in TDD with allocation of HMU and LMU to different frequencies. Each of the micro base stations 50 provides service to LMUs in the corresponding micro cell 52 in the conventional manner using the first carrier. However, as discussed below, the micro base stations 50 cooperate to provide service to HMUs, such as the HMU 56, using, for example, Coordinated Multipoint (COMP) transmission and reception schemes.

In this embodiment, the virtual macro cell 48 is managed, or hosted, by a virtual macro cell (VMC) manager 58. The VMC manager 58 generally operates as a communication point between the virtual macro cell 48 and a core network (not shown). In addition, the VMC manager 58 manages communications within the virtual macro cell 48. More specifically, the VMC manager 58 performs scheduling of downlink transmissions from the micro base stations 50 to the HMUs in the virtual macro cell 48 using the second carrier allocated to HMUs in the virtual macro cell 48, performs scheduling of uplink transmission from HMUs in the virtual macro cell 48 to the micro base stations 50, sends scheduling information for the HMUs in the virtual macro cell 48 to the micro base stations 50-1 and 50-3, sends user data to be transmitted to HMUs to the other micro base stations 50-1 and 50-3, and performs final processing of signals received from HMUs via the micro base stations 50.

Figure 5:
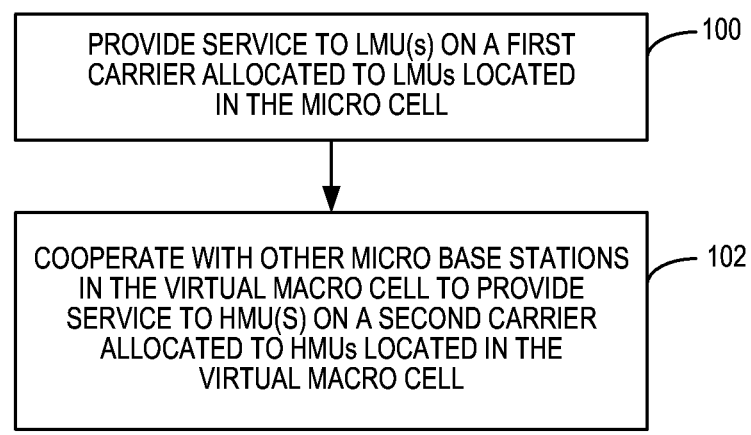
FIG. 5 is a flow chart that illustrates the operation of one of the micro base stations in the virtual macro cell of FIG. 4 according to one embodiment of the present disclosure.

FIG. 5 is a flow chart that illustrates the operation of one of the micro base stations 50 of FIG. 4 according to one embodiment of the present disclosure. This process applies to all of the micro base stations 50 providing the virtual macro cell 48. The micro base station 50 provides service to one or more LMUs on, or using, the first carrier allocated to LMUs located in the corresponding micro cell 52 (step 100). More specifically, the micro base station 50 operates in a conventional manner to provide scheduling, downlink transmission, and uplink reception for LMUs located in the micro cell 52 using the resources allocated to LMUs in the micro cell 52. For a FDD transmission and reception scheme, the micro base station 50 utilizes different carriers for downlink transmissions to and uplink transmissions from the LMU(s). In addition to providing service to the one or more LMUs, the micro base station 50 cooperates with the other micro base stations 50 in the virtual macro cell 48 to provide service to one or more HMUs on, or using, the second carrier allocated to HMUs located in the virtual macro cell 48 (step 102). Again, in one preferred embodiment, the micro base station 50 cooperates with the other micro base stations 50 to provide service to the HMU(s) in the virtual macro cell 48 using a COMP transmission and/or COMP reception scheme. Again, for a FDD transmission and reception scheme, the micro base station 50 utilizes different carriers for downlink transmissions to and uplink transmissions from the HMU(s).

Figure 6:
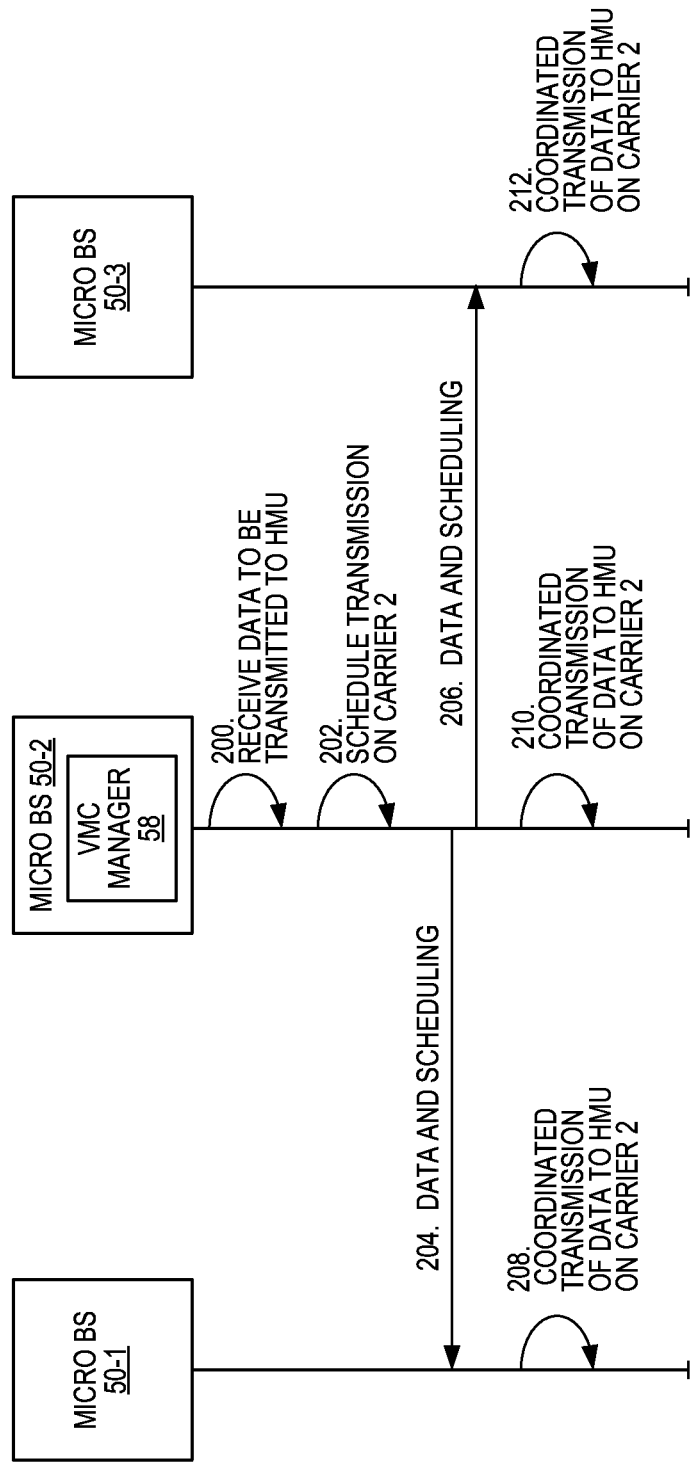
FIG. 6 illustrates the operation of the micro base stations in the virtual macro cell of FIG. 4 to provide a downlink to a high mobility UE in the virtual macro cell using Coordinated Multipoint (COMP) transmission according to one embodiment of the present disclosure.

FIG. 6 illustrates a COMP transmission scheme for transmitting a downlink transmission to the HMU 56 in the virtual macro cell 48 according to one embodiment of the present disclosure. As illustrated, the micro base station 50-2, and more specifically the VMC manager 58 of the virtual macro cell 48, receives data to be transmitted to the HMU 56 located in the virtual macro cell 48 (step 200). The VMC manager 58 schedules a downlink transmission of the data to the HMU on the second carrier (carrier 2) allocated to HMUs in the virtual macro cell 48 (step 202). The VMC manager 58 sends the data to be transmitted to the HMU 56 as well as scheduling information for the downlink transmission of the data to the HMU 56 to the other micro base stations 50-1 and 50-2 (steps 204 and 206). The micro base stations 50-1, 50-2, and 50-3 then perform coordinated transmission of the data to the HMU 56 on the second carrier as scheduled (steps 208 through 212). More specifically, the transmission of the data by the micro base stations 50-1, 50-2, and 50-3 use the same time and frequency resources. As a result of using the same time and frequency resources, during reception at the HMU 56, the transmissions from the micro base stations 50-1, 50-2, and 50-3 are combined to provide improved reception of the data at the HMU 56.

Figure 7:
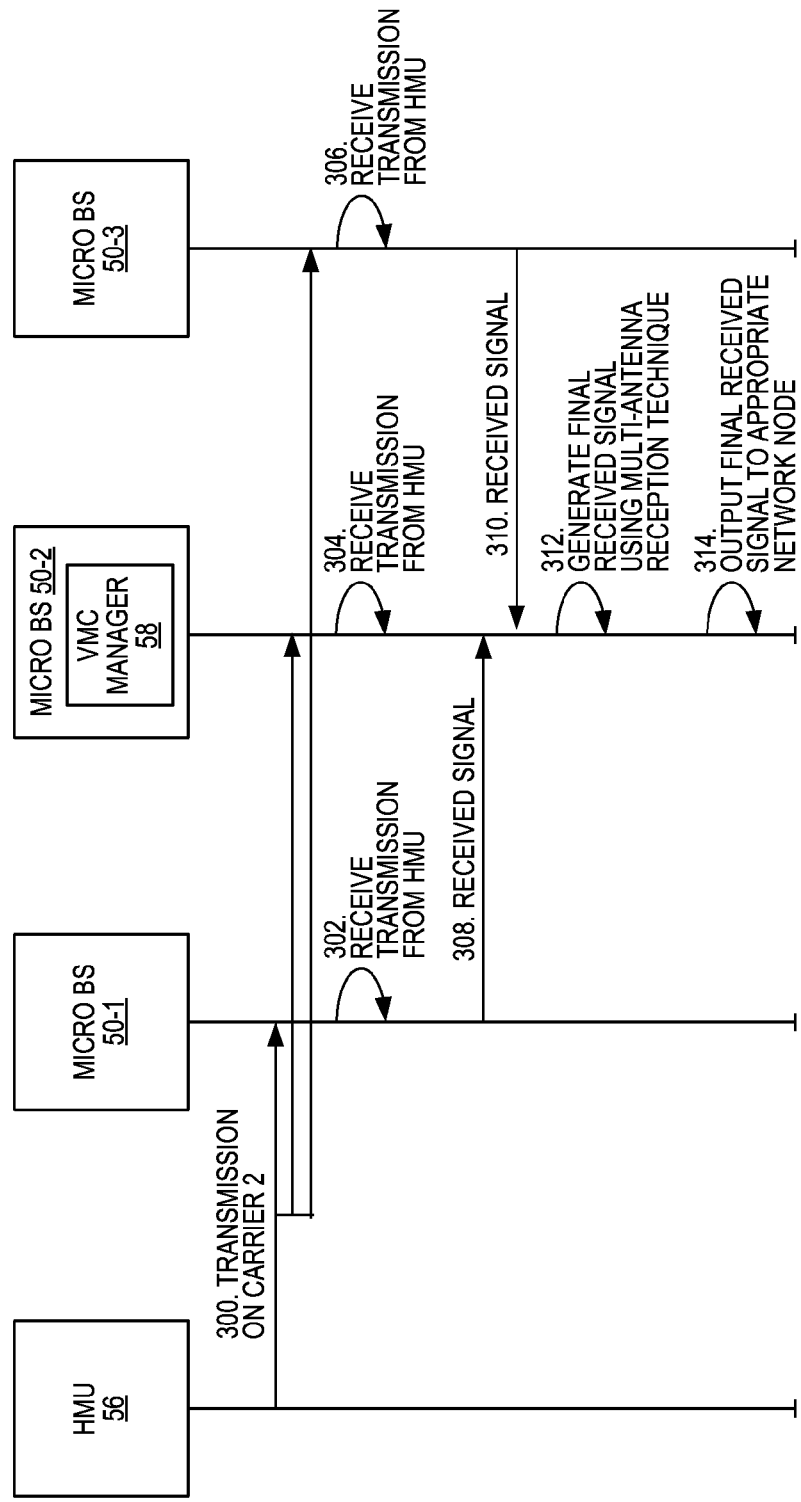
FIG. 7 illustrates the operation of the micro base stations in the virtual macro cell of FIG. 4 to receive an uplink from a high mobility UE in the virtual macro cell using COMP reception according to one embodiment of the present disclosure.

FIG. 7 illustrates a COMP reception scheme for receiving an uplink transmission from the HMU 56 in the virtual macro cell 48 according to one embodiment of the present disclosure. First, the HMU 56 transmits an uplink transmission on the second carrier allocated for HMUs located in the virtual macro cell 48 (step 300). Each of the micro base stations 50-1, 50-2, and 50-3 receives the uplink transmission from the HMU 56 on the second carrier (steps 302 through 306). The micro base stations 50-1 and 50-3 then send their received signals to the VMC manager 58 at the micro base station 50-2 (steps 308 and 310). Notably, the micro base stations 50-1 through 50-3 may be connected via wired connections, wireless connections (e.g., WiFi connections), or inband connections (e.g., wireless connections on the second carrier utilized for the virtual macro cell 48). At the micro base station 50-2, the VMC manager 58 generates a final received signal by processing the received signals of the micro base stations 50-1, 50-2, and 50-3 according to a desired multi-antenna reception scheme (step 312). The VMC manager 58 then outputs the final received signal to an appropriate network node (step 314). For example, the final received signal may be sent to a Serving Gateway (S-GW) of the core network.

Figure 8:
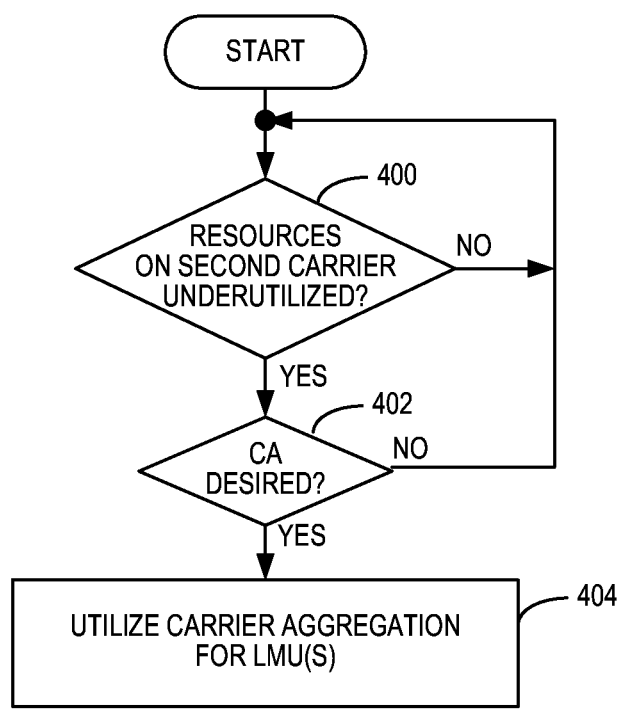
FIG. 8 illustrates the operation of one of the micro base stations to utilize carrier aggregation according to one embodiment of the present disclosure.

FIG. 8 illustrates the operation of one of the micro base stations 50 to utilize carrier aggregation according to one embodiment of the present disclosure. This process may be performed by any or all of the micro base stations 50. In general, when resources on the second carrier are not utilized, the micro base station 50 can utilize a Carrier Aggregation (CA) scheme to aggregate resources on both the first carrier and the second carrier for a downlink and/or uplink to one or more of the LMUs in the corresponding micro cell 52. More specifically, in this embodiment, the micro base station 50 determines whether resources in one time allocation for the second carrier are underutilized (step 400). As an example, for LTE, one time allocation may be one subframe. In one embodiment, the micro base station 50 determines that resources in the time allocation for the second carrier are underutilized if none of the resources on the second carrier in one time allocation are utilized for HMUs. In another embodiment, the micro base station 50 determines that resources in the time allocation for the second carrier are underutilized if at least some of the resources on the second carrier in one time allocation are not utilized for HMUs.

If the micro base station 50 determines that the resources on the second carrier for one time allocation are not underutilized, the process returns to step 400. However, if the micro base station 50 determines that the resources on the second carrier for one time allocation are underutilized, the micro base station 50 determines whether CA is desired (step 402). CA may be desired if, for example, a large amount of data is either to be transmitted to an LMU on the downlink or received from an LMU on the uplink. If CA is not desired, the process returns to step 400. However, if CA is desired, then the micro base station 50 utilizes CA for one or more LMUs (step 404). Using CA, resources on both the first carrier and the second carrier are utilized for the downlink/uplink for the one or more LMUs for which CA is desired. In this manner, the resources allocated for HMUs in the virtual macro cell 48 can be efficiently utilized even in the situation where HMUs are underutilizing the resources.

Figure 9:
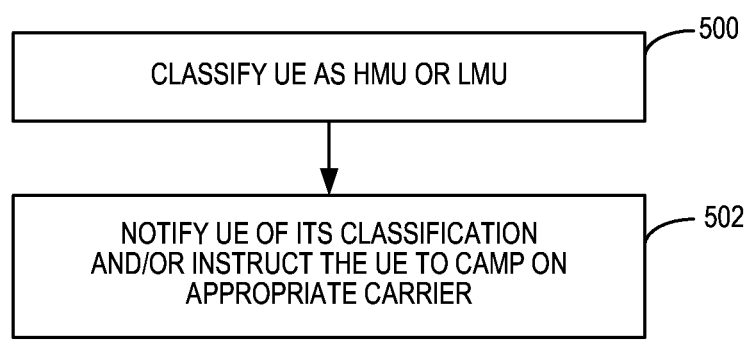
FIG. 9 illustrates a process for classifying a UE as either a low mobility UE or a high mobility UE during an idle state of the UE according to one embodiment of the present disclosure.

Thus far, the discussion has focused on the operation of the virtual macro cell 48. Now, the discussion turns to the classification of UEs as either HMUs or LMUs as well as the manner in which LMUs are enabled to be connected to the appropriate micro cell 52 using the corresponding first carrier of the micro cell 52 and HMUs are enabled to connect to the virtual macro cell 48 using the second carrier allocated for the virtual macro cell 48. In this regard, FIG. 9 is a flow chart that illustrates a process in which a UE is classified as either an HMU or an LMU during an idle, or non-connected, state of the UE according to one embodiment of the present disclosure. First, the UE is classified as either an HMU or an LMU (step 500). In this embodiment, the UE is classified by the heterogeneous cellular communications network 46. For instance, the UE may be classified by one of the micro base stations 50 (i.e., the micro base station 50-2 including the VMC manager 58 or one of the other micro base stations 50-1 or 50-3). The classification of the UE can be based on any information that is suitable for determining whether a mobility of the UE either in terms of speed or handovers is greater than a predefined threshold.

In one embodiment, when in the idle state, the UE is classified based on historical information maintained for the UE. The historical information is maintained by the heterogeneous cellular communications network 46 (e.g., by a Mobility Management Entity (MME)). The historical information may include information for the current day, the previous day, the previous week, the previous month, or the like. In general, the historical information includes information related to the mobility of the UE. For example, the historical information may include one or more of the following:

speed measurements for the UE and corresponding timestamps, an average speed of the UE for different times of the day and/or days of the week, a number of handovers for the UE during one or more prior connections, an average number of handovers for the UE per connection, an average number of handovers for the UE during connections for different times of the day and/or days of the week (e.g., the current day and time), a handover rate for the UE during one or more prior connections, an average handover rate for the UE per connection, an average handover rate for the UE per connection at different times of the day and/or days of the week (e.g., the current day and time), Doppler shift measurements for the UE and corresponding timestamps, and an average Doppler shift for the UE for different times of the day and/or days of the week (e.g., the current day and time).

The examples given above are for illustration purposes only and are not intended to limit the scope of the present disclosure. Other types of historical information that is indicative of the mobility of the UE may additionally or alternatively be used. The historical information is compared to one or more predefined thresholds (e.g., a predefined speed threshold, a predefined handover rate threshold, or the like) to determine whether the UE is an HMU or an LMU. For example, if the average speed of the UE for the current date and time is greater than a predefined threshold speed (e.g., 20 Miles per hour (Mph)), then the UE can be predicted to be, and therefore classified as, an HMU. Otherwise, the UE can be classified as an LMU.

In another embodiment, when in the idle state, the UE reports its speed to the heterogeneous cellular communications network 46. The UE can then be classified based on its reported speed. In yet another embodiment, the UE can be classified on a Doppler shift measured for the UE for transmissions made by the UE when in the idle state (e.g., a Doppler shift measured for location update(s) from the UE when in the idle state). The Doppler shift is indicative of speed. It should be noted that the classification of the UE can be performed by the heterogeneous cellular communications network 46 or the UE may classify itself. Thus, in other embodiment, the UE classifies itself based on, for example, the speed of the UE as determined by the UE (e.g., by a Global Positioning System (GPS) receiver of the UE or Doppler shift measured by the UE).

Once the UE is classified, the heterogeneous cellular communications network 46 either notifies the UE of its classification or instructs the UE to camp on the appropriate carrier (i.e., the first carrier if the UE is an LMU or the second carrier if the UE is an HMU) (step 502). Any suitable mechanism may be used to either notify the UE of its classification or instruct the UE to camp on the appropriate carrier. As one example, in the case of LTE, this may take the form of base station directed handoff. As another example, for LTE, a new field may be created in the base station's System Information on the control channel to provide the UE with the appropriate carrier to camp on in idle mode. In the case that the UE is an HMU, instructing the UE to camp on the appropriate carrier for the virtual macro cell 48 insures that the UE is in the virtual macro cell 48 and not generating numerous location updates, nor requiring definition of a large paging zone which would also result in a high number of wasted pages in the heterogeneous cellular communications network 46. Likewise, the paging zone for the LMU carrier can be smaller as there is less likelihood that the LMU will transition quickly out of coverage.

Figure 10:
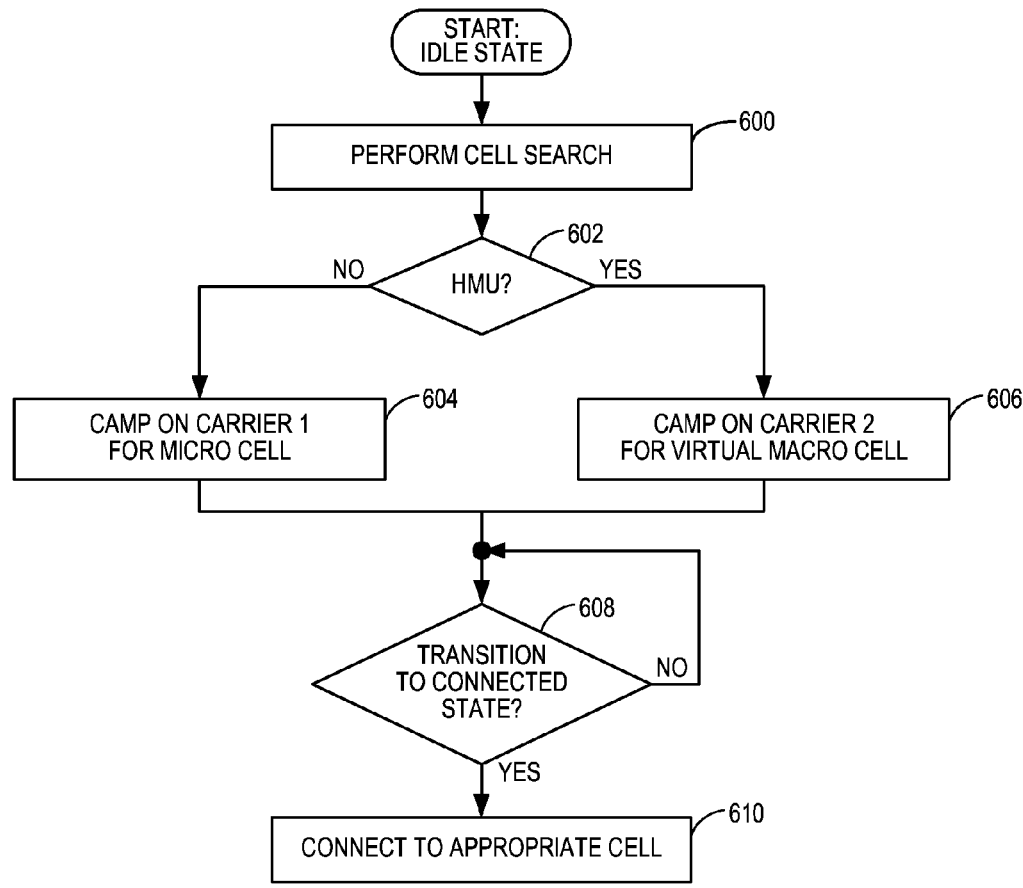
FIG. 10 illustrates the operation of a UE located in one of the micro cells within the virtual macro cell according to one embodiment of the present disclosure in which classification of the UE occurs when the UE is in the idle state.

FIG. 10 illustrates the operation of a UE when the UE is classified during the idle state according to one embodiment of the present disclosure. First, the UE performs a cell search (step 600). More specifically, using LTE as an example, primary and second synchronization signals are transmitted for both the micro cells 52 and the virtual macro cell 48. Using the primary and second synchronization signals, the UE is enabled to identify and synchronize to the micro cells 52 when in range of the corresponding micro base stations 50 and the virtual macro cell 48 when in range of one or more of the micro base stations 50. Notably, system information communicated to the UE during the cell search may include information that informs the UE which cell is the virtual macro cell 48 (or which carrier is that of the virtual macro cell 48) and which cell is the micro cell 52. For this discussion, assume that, during the cell search, the UE found at least one of the micro cells 52 and the virtual macro cell 48.

After the cell search is complete, the UE determines whether the UE is an HMU (step 602). In one embodiment, the UE has been notified of and stored its classification and prior to step 602, and the UE determines whether it is an HMU based on its stored classification. In another embodiment, the UE determines whether it is an HMU based on its current speed or measured Doppler shift. If the UE is not an HMU, the UE camps on the first carrier allocated for LMUs located in the micro cell 52 (step 604). If the UE is an HMU, the UE camps on the second carrier allocated for HMUs located in the virtual macro cell 48 (step 606). The term "camp on" is a term of art for cellular communications networks. When a UE camps on a carrier or cell, the UE has selected the cell as the cell to which it will connect in the event of a transition from idle to connected state and for providing location update information. It should also be noted that the term "camped" is used in the $3^{rd}$ Generation Partnership Project (3GPP) LTE specifications.

After camping on the appropriate carrier, the UE monitors itself to determine whether a transition to the connected state is triggered (step 608). If not, the UE may continue to monitor for a trigger to transition to the connected state. Notably, at least periodically, the UE returns to step 600 to perform a new cell search. At some point, when a trigger to transition to the connected state is detected, the UE connects to the appropriate cell (step 610). More specifically, if the UE is an LMU and is camped on the first carrier, the UE connects to the micro base station 50 that serves the micro cell 52. If the UE is an HMU and is camped on the second carrier, the UE connects to the virtual macro cell 48.

Figure 11:
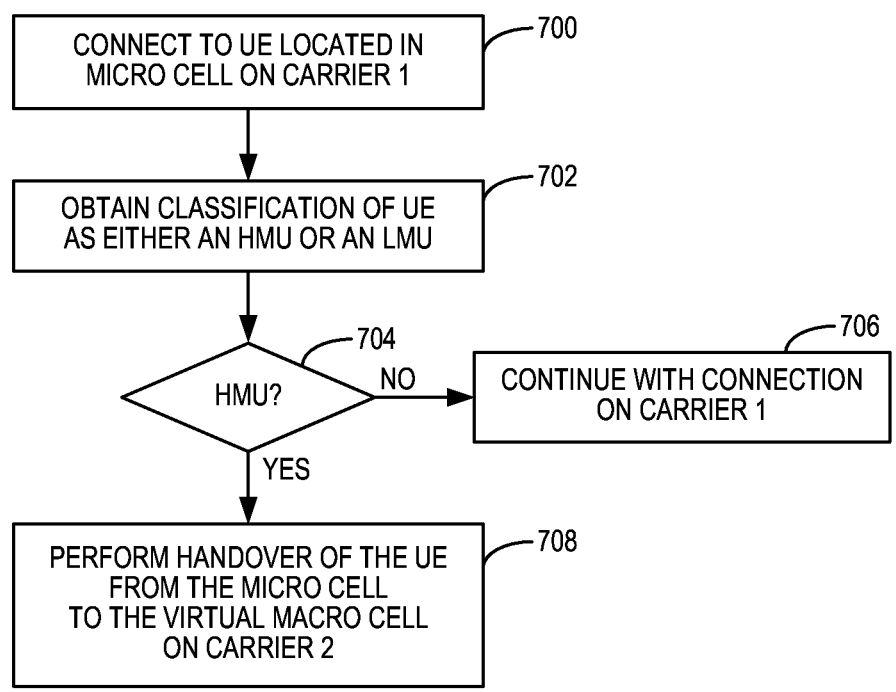
FIG. 11 illustrates the operation of one of the micro base stations in the virtual macro cell to classify a UE while the UE is in the connected state and, if needed, handing over the UE from the carrier for the virtual macro cell according to one embodiment of the present disclosure.
Figure 12:
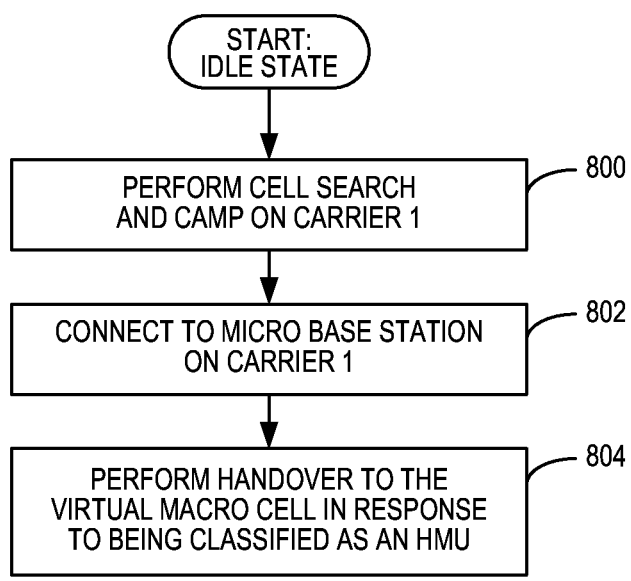
FIG. 12 illustrates the operation of a UE located in one of the micro cells within the virtual macro cell to connect to the corresponding micro base station and then performing a handover to the carrier for the virtual macro cell if the UE is classified as a high mobility UE according to one embodiment of the present disclosure.

In the embodiments of FIGS. 11 and 12, the UE is classified when in the idle state. FIGS. 11 and 12 are flow charts that illustrate embodiments of the operation of one of the micro base stations 50 and an UE, respectively, in which the UE is classified during the connected state. In this regard, FIG. 11 illustrates the operation of one of the micro base stations 50 according to one embodiment of the present disclosure. This discussion is equally applicable to the other micro base stations 50 in the virtual macro cell 48. As illustrated, the micro base station 50 connects to the UE in the micro cell 52 served by the micro base station 50 on the first carrier allocated to LMUs in the micro cell 52 (step 700). While the UE is in the connected state or as the UE transitions from the idle state to the connected state, the micro base station 50 obtains a classification of the UE as either an HMU or an LMU (step 702).

In one embodiment, the micro base station 50 obtains the classification of the UE by classifying the UE based on a comparison of information indicative of the mobility of the UE and one or more predefined thresholds. In another embodiment, the UE is classified by another network node, and the micro base station 50 obtains the classification from that network node. In either embodiment, the information indicative of the mobility of the UE includes, for example, one or more of the following:

a rate of handover requests by the UE while in the connected state for the current session where a high handover rate indicates high mobility, a number of cell connections for the UE for the current session where, for LTE, the number of cell connections can be obtained from a UE history in a X2/S1 handoff message for the UE, historical information for the UE such as that described above, a Doppler shift in transmission(s) from the UE, which can be used to provide an estimate of a speed of the UE, or a speed of the UE reported by the UE.

These examples are for illustrative purposes only and are not intended to limit the scope of the present disclosure. Any information that is indicative of the mobility of the UE can be compared to one or more predefined thresholds in order to classify the UE. For example, the rate of handover requests may be compared to a predefined threshold such that the UE is classified as an HMU if the rate of handover requests is greater than the predefined threshold. It should be noted that the classification of the UE may alternatively be performed by the UE and then obtained by the micro base station 50. For example, the UE may classify itself based on, for example, the speed of the UE as determined by the UE (e.g., by a GPS receiver of the UE or Doppler shift measured by the UE).

Once the classification of the UE is obtained, the micro base station 50 determines whether the UE is classified as an HMU (step 704). If not, operation continues with the connection to the UE on the first carrier allocated for LMUs (step 706). If the UE is classified as an HMU, the micro base station 50 interacts with the UE to perform a handover of the UE from the micro cell 52 to the virtual macro cell 48 (step 708). As a result of the handover, the UE is connected to the virtual macro cell 48 on the second carrier allocated to HMUs located in the virtual macro cell 48. Before proceeding, it should be noted that while in this embodiment the UE initially connected to the micro cell 52 on the first carrier allocated to LMUs, in an alternative embodiment, the UE initially connects to the virtual macro cell 48 on the second carrier allocated to the HMUs located in the virtual macro cell 48.

FIG. 12 illustrates the operation of a UE for one embodiment in which the UE is classified during the connected state. First, the UE performs a cell search and camps on the first carrier allocated for LMUs located in the micro cell 52 (step 800). As a result of the cell search, the UE has identified the micro cell 52 served by one of the micro base stations 50. The UE connects to the micro base station 50 on the first carrier allocated to LMUs located in the micro cell 52 served by the micro base station 50 (step 802). Either during the transition of the UE from the idle state to the connected state or during the connected state, the micro base station 50 obtains a classification of the UE as an HMU. In response, the UE interacts with the micro base station 50 to perform a handover of the UE from the micro cell 52 to the virtual macro cell 48 (step 804). In doing so, the UE is transitions from the first carrier allocated to LMUs located in the micro cell 52 to the second carrier allocated to HMUs located in the virtual macro cell 48. Notably, while in the embodiment of FIG. 12 the UE initially connects to the micro cell 52, the present disclosure is not limited thereto. In an alternative embodiment, the UE initially connects to the virtual macro cell 48 and is then handed over to the appropriate micro cell 52 if the UE is classified as an LMU.

The virtual macro cell 48 disclosed herein provides numerous benefits and advantages. Some exemplary, non-limiting benefits include providing a coverage footprint suitable to HMUs while reducing handover overhead including paging, improving HMU connectivity, and reducing macro cell to micro cell and micro cell to macro cell interference. In addition, carrier aggregation can be utilized to provide efficient utilization of resources. Still further, the virtual macro cell 48 may eliminate the need for a macro cell in some deployments.

Figure 13:
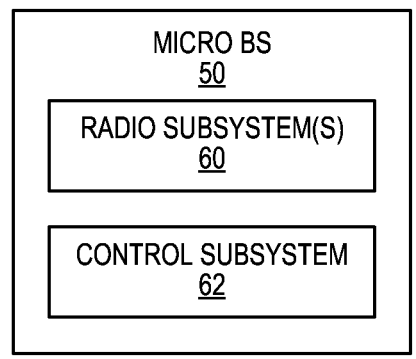
FIG. 13 is a block diagram of a micro base station according to one embodiment of the present disclosure.

FIG. 13 is a block diagram of one of the micro base stations 50 according to one embodiment of the present disclosure. As illustrated, the micro base station 50 includes one or more radio subsystems 60 and a control subsystem 62. One of the one or more radio subsystems 60 generally includes analog and, in some embodiments, digital components for sending and receiving data to and from UEs within the micro cell 52. In addition, the one or more radio subsystems 60 may include one or more additional radio subsystems 60 for sending data to or receiving data from one or more of the other micro base stations 50, a macro base station, or some other network node. Alternatively, the micro base station 50 may communicate with other network nodes (e.g., one or more of the other micro base stations 50, a macro node, or some other network nodes such as an MME) via wired connections. In particular embodiments, each of the one or more radio subsystems 60 may represent or include radio frequency (RF) transceivers, or separate RF transmitters and receivers, capable of transmitting suitable information wirelessly to other network components or nodes. From a wireless communications protocol view, the one or more radio subsystems 60 implement at least part of Layer 1 (i.e., the Physical or "PHY" Layer).

The control subsystem 62 generally implements any remaining portion of Layer 1 as well as functions for higher layers in the wireless communications protocol (e.g., Layer 2 (data link layer), Layer 3 (network layer), etc.). In particular embodiments, the control subsystem 62 may comprise, for example, one or several general-purpose or special-purpose microprocessors or other microcontrollers programmed with suitable software and/or firmware to carry out some or all of the functionality of the micro base station 50 described herein. In addition or alternatively, the control subsystem 62 may comprise various digital hardware blocks (e.g., one or more Application Specific Integrated Circuits (ASICs), one or more off-the-shelf digital and analog hardware components, or a combination thereof) configured to carry out some or all of the functionality of the micro base station 50 described herein. Additionally, in particular embodiments, the above described functionality of micro base station 50 may be implemented, in whole or in part, by the control subsystem 62 executing software or other instructions stored on a non-transitory computer-readable medium, such as random access memory (RAM), read only memory (ROM), a magnetic storage device, an optical storage device, or any other suitable type of data storage components. Of course, the detailed operation for each of the functional protocol layers, and thus the one or more radio subsystems 60 and the control subsystem 62, will vary depending on both the particular implementation as well as the standard or standards supported by the micro base station 50.

Figure 14:
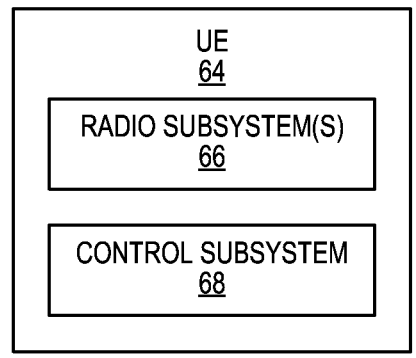
FIG. 14 is a block diagram of a UE according to one embodiment of the present disclosure.

FIG. 14 is a block diagram of a UE 64 according to one embodiment of the present disclosure. As illustrated, the UE 64 includes one or more radio subsystems 66 and a control subsystem 68. The one or more radio subsystems 66 generally include analog and, in some embodiments, digital components for sending and receiving data to and from the micro base stations 50 and, if present, a macro base station. In particular embodiments, each of the one or more radio subsystems 66 may represent or include RF transceivers, or separate RF transmitters and receivers, capable of transmitting suitable information wirelessly to other network components or nodes. From a wireless communications protocol view, the one or more radio subsystems 66 implement at least part of Layer 1 (i.e., the Physical or "PHY" Layer).

The control subsystem 68 generally implements any remaining portion of Layer 1 as well as functions for higher layers in the wireless communications protocol (e.g., Layer 2 (data link layer), Layer 3 (network layer), etc.). In particular embodiments, the control subsystem 68 may comprise, for example, one or several general-purpose or special-purpose microprocessors or other microcontrollers programmed with suitable software and/or firmware to carry out some or all of the functionality of the UE 64 described herein. In addition or alternatively, the control subsystem 68 may comprise various digital hardware blocks (e.g., one or more ASICs, one or more off-the-shelf digital and analog hardware components, or a combination thereof) configured to carry out some or all of the functionality of the UE 64 described herein. Additionally, in particular embodiments, the above described functionality of UE 64 may be implemented, in whole or in part, by the control subsystem 68 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the one or more radio subsystems 66 and the control subsystem 68, will vary depending on both the particular implementation as well as the standard or standards supported by the UE 64.

The following acronyms are used throughout this disclosure.

3GPP 3$^{rd}$ Generation Partnership Project
ASIC Application Specific Integrated Circuit
BS Base Station
CA Carrier Aggregation
COMP Coordinated Multipoint
FDD Frequency Division Duplexing
GPRS General Packet Radio Service GPS Global Positioning System
GSM Global System for Mobile Communications
HMU High Mobility User Equipment
HO Handover
HSPA High Speed Packet Access
LMU Low Mobility User Equipment
LTE Long Term Evolution
MHz Megahertz
MME Mobility Management Entity
RAM Random Access Memory
RAN Radio Access Network
RF Radio Frequency
ROM Read Only Memory
S-GW Serving Gateway
TDD Time Division Duplexing
UE User Equipment
VMC Virtual Macro Cell Those skilled in the art will recognize improvements and modifications to the preferred embodiments of the present disclosure. All such improvements and modifications are considered within the scope of the concepts disclosed herein and the claims that follow.

What is claimed is:

1. A method of operation of a micro base station in a heterogeneous cellular communications network, comprising:
providing service to a low mobility user equipment using one or more first resources allocated to low mobility user equipments located in a micro cell served by the micro base station; and
cooperating with one or more additional micro base stations to provide service to a high mobility user equipment using one or more second resources allocated to high mobility user equipments located in a virtual macro cell served by the micro base station and the one or more additional micro base stations.

2. The method of claim 1 wherein the micro base station operates as a manager of the virtual macro cell.

3. The method of claim 2 wherein:
the one or more first resources comprise a first carrier allocated to downlinks to low mobility user equipments located in the micro cell served by the micro base station; and
the one or more second resources comprise a second carrier allocated to downlinks to high mobility user equipments located in the virtual macro cell served by the micro base station and the one or more additional micro base stations.

4. The method of claim 3 wherein cooperating with the one or more additional micro base stations to provide service to the high mobility user equipment comprises:
scheduling coordinated downlink transmissions from the micro base station and the one or more additional micro base stations to the high mobility user equipment on the second carrier.

5. The method of claim 2 wherein:
the one or more first resources comprise a first carrier allocated to uplinks from low mobility user equipments located in the micro cell served by the micro base station; and
the one or more second resources comprise a second carrier allocated to uplinks from high mobility user equipments located in the virtual macro cell served by the micro base station and the one or more additional micro base stations.

6. The method of claim 5 wherein cooperating with the one or more additional micro base stations to provide service to the high mobility user equipment comprises:
scheduling coordinated uplink transmissions from high mobility user equipment to the micro base station and the one or more additional micro base stations on the second carrier.

7. The method of claim 1 wherein:
the one or more first resources comprise a first carrier allocated to downlinks to low mobility user equipments located in the micro cell served by the micro base station;
the one or more second resources comprise a second carrier allocated to downlinks to high mobility user equipments located in the virtual macro cell served by the micro base station and the one or more additional micro base stations; and
cooperating with the one or more additional micro base stations to provide service to the high mobility user equipment comprises cooperating with the one or more additional micro base stations to provide a downlink to the high mobility user equipment on the second carrier using a coordinated transmission scheme.

8. The method of claim 7 wherein the micro base station operates as a manager of the virtual macro cell, and cooperating with the one or more additional micro base stations to provide the downlink to the high mobility user equipment on the second carrier using the coordinated transmission scheme comprises:
receiving data to be transmitted to the high mobility user equipment;
scheduling a transmission of the data to the high mobility user equipment on the second carrier;
sending the data and scheduling information to the one or more additional micro base stations, the scheduling information comprising information that identifies resources on the second carrier scheduled for the transmission of the data to the high mobility user equipment as a result of scheduling the transmission; and
transmitting the data to the high mobility user equipment on the second carrier using the resources on the second carrier scheduled for the transmission of the data to the high mobility user equipment such that transmission of the data from the micro base station is coordinated with transmission of the data from the one or more additional micro base stations.

9. The method of claim 7 wherein one of the one or more additional micro base stations operates as a manager of the virtual macro cell, and cooperating with the one or more additional micro base stations to provide the downlink to the high mobility user equipment on the second carrier using the coordinated transmission scheme comprises:
receiving data to be transmitted to the high mobility user equipment and scheduling information from the manager of the virtual macro cell, the scheduling information comprising information that identifies resources on the second carrier scheduled for transmission of the data to the high mobility user equipment; and
transmitting the data to the high mobility user equipment on the second carrier using the resources on the second carrier scheduled for the transmission of the data to the high mobility user equipment such that transmission of the data from the micro base station is coordinated with transmission of the data from the one or more additional micro base stations.

10. The method of claim 1 wherein:
the one or more first resources comprise a first carrier allocated to uplinks from low mobility user equipments located in the micro cell served by the micro base station;
the one or more second resources comprise a second carrier allocated to uplinks from high mobility user equipments located in the virtual macro cell served by the micro base station and the one or more additional micro base stations; and
cooperating with the one or more additional micro base stations to provide service to the high mobility user equipment comprises cooperating with the one or more additional micro base stations to receive an uplink from the high mobility user equipment on the second carrier using a coordinated reception scheme.

11. The method of claim 10 wherein the micro base station operates as a manager of the virtual macro cell, and cooperating with the one or more additional micro base stations to receive the uplink from the high mobility user equipment on the second carrier using the coordinated reception scheme comprises:
scheduling an uplink transmission from the high mobility user equipment on the second carrier;
receiving the uplink transmission from the high mobility user equipment;
obtaining one or more additional versions of the uplink transmission received by the one or more additional micro base stations;
processing the uplink transmission received from the high mobility user equipment and the one or more additional versions of the uplink transmission received by the one or more additional micro base stations to provide a final received signal; and
outputting the final received signal to an appropriate network node in the heterogeneous cellular communications network.

12. The method of claim 10 wherein one of the one or more additional micro base stations operates as a manager of the virtual macro cell, and cooperating with the one or more additional micro base stations to receive the uplink from the high mobility user equipment on the second carrier using the coordinated reception scheme comprises:
receiving an uplink transmission from the high mobility user equipment on the second carrier; and
providing the uplink transmission to the one of the one or more additional micro base stations that operates as the manager of the virtual macro cell.

13. The method of claim 1 wherein:
the one or more first resources comprise a first carrier allocated to downlinks to low mobility user equipments located in the micro cell served by the micro base station; and
the one or more second resources comprise a second carrier nominally allocated to downlinks to high mobility user equipments located in the virtual macro cell served by the micro base station and the one or more additional micro base stations;
wherein the method further comprises providing service to a low mobility user equipment using both the first carrier and the second carrier according to a carrier aggregation scheme.

14. The method of claim 1 wherein:
the one or more first resources comprise a first carrier allocated to uplinks from low mobility user equipments located in the micro cell served by the micro base station; and
the one or more second resources comprise a second carrier nominally allocated to uplinks from high mobility user equipments located in the virtual macro cell served by the micro base station and the one or more additional micro base stations;
wherein the method further comprises providing service to a low mobility user equipment using both the first carrier and the second carrier according to a carrier aggregation scheme.

15. The method of claim 1 wherein the high mobility user equipment is a user equipment having a speed that exceeds a predefined threshold speed.

16. The method of claim 1
wherein the high mobility user equipment is a user equipment having a rate of handover requests that is greater than a predefined threshold rate.

17. The method of claim 1
wherein the high mobility user equipment is a user equipment where, for a particular session, a number of cell connections for the user equipment is greater than a predefined number of cell connections.

18. The method of claim 1
wherein the high mobility user equipment is a user equipment having a Doppler shift that is greater than a predefined threshold Doppler shift.

19. The method of claim 1 wherein the high mobility user equipment is a user equipment that is predicted to have high mobility based on historical information for the user equipment.

20. A micro base station in a heterogeneous cellular communications network, comprising:
a radio subsystem comprising one or more first resources allocated to low mobility user equipments located in a micro cell served by the micro base station and one or more second resources allocated to high mobility user equipments located in a virtual macro cell served by the micro base station and one or more additional micro base stations; and
a control subsystem associated with the radio subsystem and configured to:
provide service to a low mobility user equipment using the one or more first resources allocated to low mobility user equipments located in the micro cell served by the micro base station; and
cooperate with the one or more additional micro base stations to provide service to a high mobility user equipment using the one or more second resources allocated to high mobility user equipments located in the virtual macro cell served by the micro base station and the one or more additional micro base stations.

21. A method of operation of a heterogeneous cellular communications network comprising:
classifying at least some user equipments as either high mobility user equipments or low mobility user equipments; and
when a user equipment of the at least some user equipments is located within one of a plurality of micro cells aggregated to form a virtual macro cell:
providing service to the user equipment using one or more first resources allocated to low mobility user equipments in the one of the plurality of micro cells in which the user equipment is located if the user equipment is a low mobility user equipment, wherein the one or more first resources comprise a first carrier allocated to downlinks to low mobility user equipments located in a micro cell of the plurality of micro cells served by a micro base station; and providing service to the user equipment using one or more second resources allocated to high mobility user equipments in the virtual macro cell if the user equipment is a high mobility user equipment, wherein the one or more second resources comprise a second carrier allocated to downlinks to high mobility user equipments located in the virtual macro cell served by the micro base station and one or more additional micro base stations.

22. The method of claim 21 wherein classifying the at least some user equipments comprises classifying each of the at least some user equipments as either high mobility user equipments or low mobility user equipments based on at least one of a group consisting of: speed, rate of handover requests, number of cell connections for a particular session, historical information, and Doppler shift.

23. The method of claim 21 wherein classifying the at least some user equipments comprises classifying the at least some user equipments at one of a plurality of micro base stations serving the plurality of micro cells.

24. The method of claim 23 wherein the one of the plurality of micro base stations operates as a manager of the virtual macro cell.

25. The method of claim 23 wherein a different one of the plurality of micro base stations operates as a manager of the virtual macro cell.

\* \* \* \* \*